United States Patent
Flisch

[11] 3,730,028
[45] May 1, 1973

[54] MULTIPLE SPINDLE AUTOMATIC LATHE

[75] Inventor: Hermann Flisch, Eichholz, Maienfeld, Switzerland

[73] Assignee: Eunipp, AG, Zug, Switzerland

[22] Filed: Nov. 27, 1970

[21] Appl. No.: 93,152

[30] Foreign Application Priority Data

Dec. 3, 1969 Switzerland..................18,101/69

[52] U.S. Cl..............................................82/3, 29/37
[51] Int. Cl. ..................................................B23b 9/10
[58] Field of Search.......................82/3, 2 D; 29/37, 29/37 A

[56] References Cited

UNITED STATES PATENTS

| 3,693,485 | 9/1972 | Maurer | 82/3 |
| 1,299,883 | 4/1919 | Warren | 29/37 A |
| 2,473,306 | 6/1949 | Schreiber | 82/3 X |
| 1,806,562 | 5/1931 | Pichler | 29/37 A |
| 2,757,565 | 8/1956 | Fluskey et al | 29/37 A |

FOREIGN PATENTS OR APPLICATIONS 15,493 7/1910 Great Britain..........................29/37

*Primary Examiner*—Leonidas Vlachos
*Attorney*—Lackenbach & Lackenbach

[57] ABSTRACT

Multiple spindle automatic lathe having means for enabling axial movement of the spindles in the spindle carrier and means for enabling automatic movement thereof.

10 Claims, 6 Drawing Figures

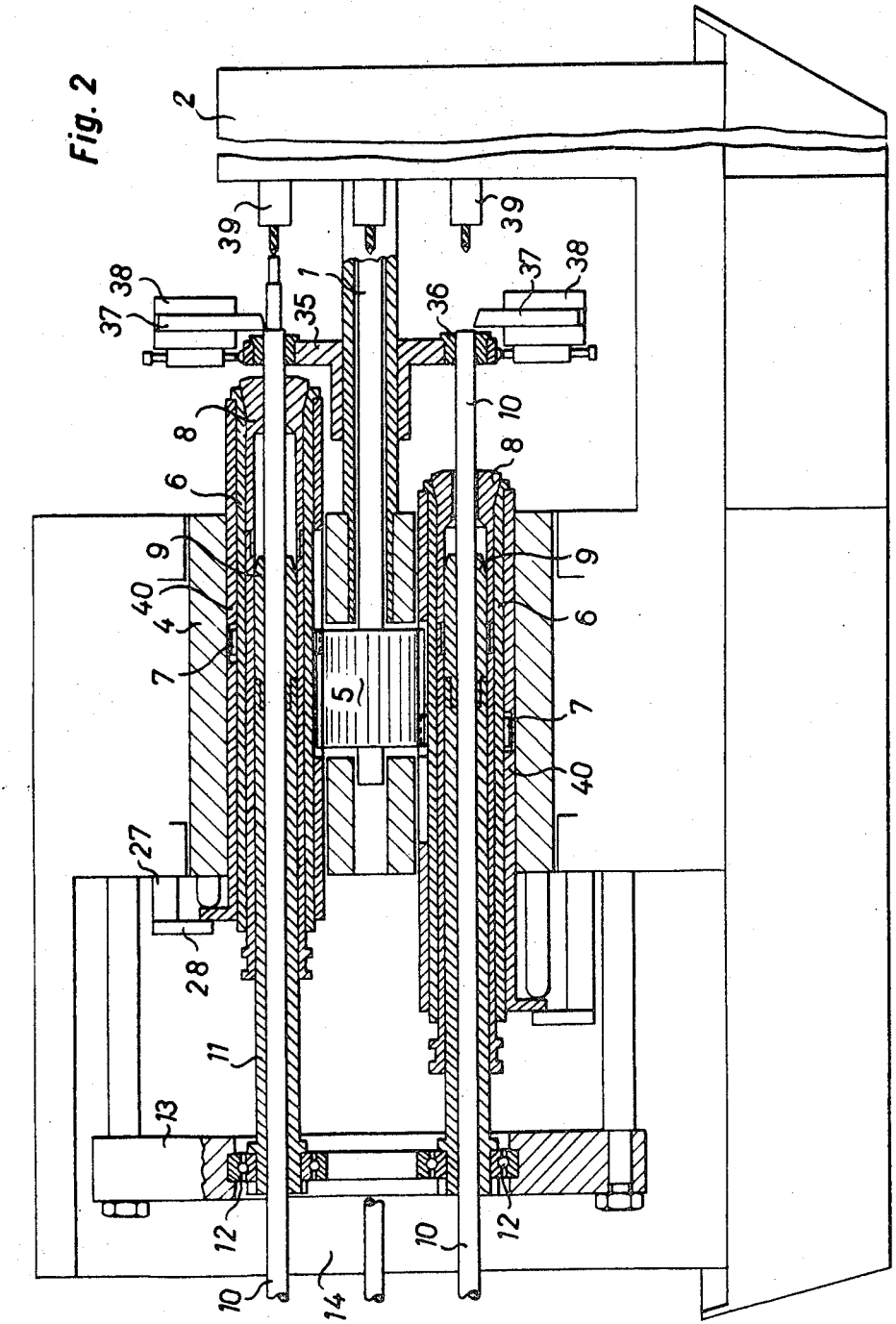

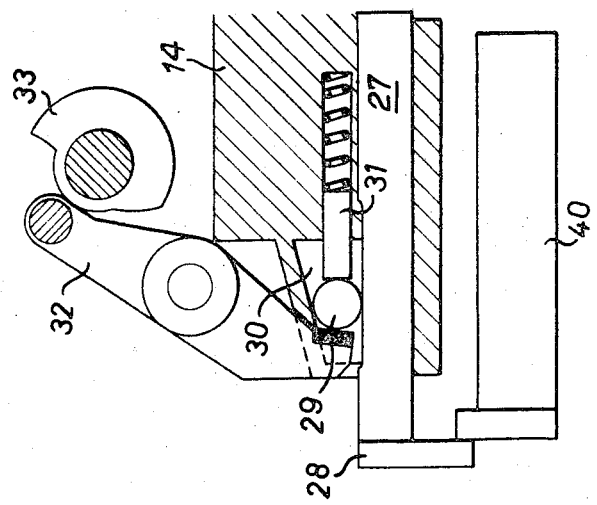
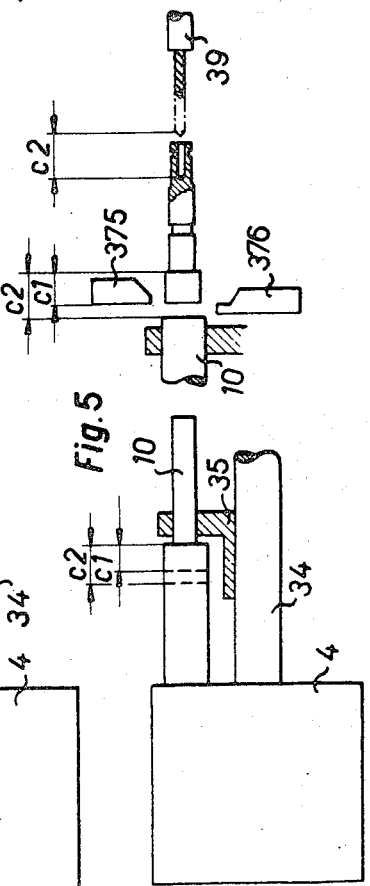
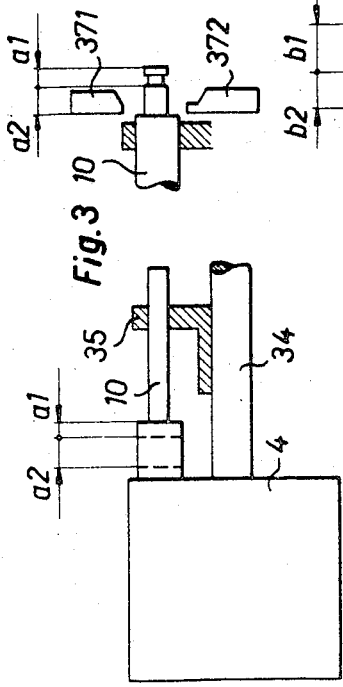
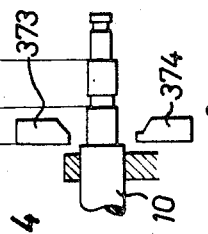
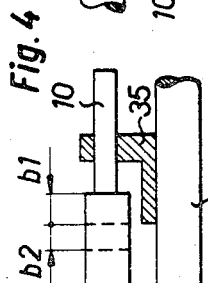

MULTIPLE SPINDLE AUTOMATIC LATHE

The present invention relates to lathes and, more particularly, to multiple spindle automatic lathes and finds particular utility in connection with bar-type machines wherein bar stock may be fed through the spindles to a work position.

In multiple spindle automatic lathes or machines, the plurality of spindles for simultaneously rotating the number of work pieces of lengths of bar stock are mounted in a generally cylindrical pattern in a spindle carrier or drum which itself is rotatable about its central axis so that the spindles may be sequentially indexed or advanced to each of the spindle positions. Opposite each spindle position are tool slides carrying the necessary tools for the respective operations. The tool slides do not index or revolve the spindle carrier so that as the spindle carrier is indexed by steps, the work pieces or lengths of bar stock in each of the work spindles is brought successively in line with the various tools mounted on the tool slide and the work pieces or bars in each spindle are machined simultaneously. As an individual work piece or bar is indexed through the various positions it is therefore worked on sequentially by each of the tools and a finished piece is produced with each advance of the spindle carrier.

Two types of tool slides are generally provided on this type of machine; an end slide which is generally axially in line with the spindle carrier and which may be automatically advanced axially towards and away from the spindle carrier but which is not capable of any transverse movement and transverse tool slides which generally move radially of the spindles and which are not capable of any movement longitudinal the work pieces or spindles. While tool movement perpendicular to the usual motion direction of the slides may be produced by use of auxiliary or supplemental tooling having builtin drive means, such supplemental tooling having separate drives is not always entirely satisfactory.

Moreover, the tools ordinarily mounted on the transverse tool slides are generally form tools, that is, they perform only a single plunge cut while the work piece is rotated without any longitudinal feeding movement and, therefore, the number of different types of cuts that can be performed from the transverse slides is limited and, the machining of geometrically complex work pieces may be difficult.

Having in mind the foregoing, it is a primary object of the present invention to provide multiple spindle machines having increased capabilities.

Another primary object of the present invention, in addition to the foregoing object, is to provide such multiple spindle machines adapted to more easily machine geometrically complex work pieces.

Still another primary object of the present invention, in addition to the foregoing objects, is the provision of such machines constructed and arranged to enable both longitudinal and transverse machining from the transverse slides.

Yet still another primary object of the present invention, in addition to each of the foregoing objects, is the provision of such machines wherein longitudinal and transverse machining can be performed by the tool posts associated with the spindles in any position of the latter.

Yet still another primary object of the present invention, in addition to each of the foregoing objects, is the provision of such machines wherein the work piece or bars may be continuously or intermittently advanced during machining and affixed in any position desired.

Another and yet still further primary object of the present invention, in addition to each of the foregoing objects, is the provision of such machines wherein the spindles are longitudinally movable within the spindle carrier or drum.

Another and still further primary object of the present invention, in addition to each of the foregoing objects, is the provision of such machines wherein the spindles are longitudinally adjustable within the spindle carrier or drum.

Still further, it is yet another primary object of the present invention, in addition to each of the foregoing objects, to provide such machines wherein the spindles may be automatically advanced during machining.

Still another and yet further primary object of the present invention, in addition to each of the foregoing objects, is the provision of such machines which are economical to manufacture, easily set up and adjusted, and sturdy and efficient in use.

The invention resides in the combination, construction, arrangement and disposition of the various component parts and elements incorporated in improved machines constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

IN THE DRAWING

FIG. 2 is another side elevational cross-sectional view of the machine shown in FIG. 1;

FIG. 3 illustrates diagramatically machining of an exemplary work piece at a first spindle position;

FIG. 4 illustrates diagramatically further machining operations conducted on the exemplary work piece at a second spindle position;

FIG. 5 illustrates diagramatically completion of the machining operation on the exemplary work piece at a third spindle position; and FIG. 6 is an enlarged partial view of the spindle clamping structure of the present invention.

Figure 1:
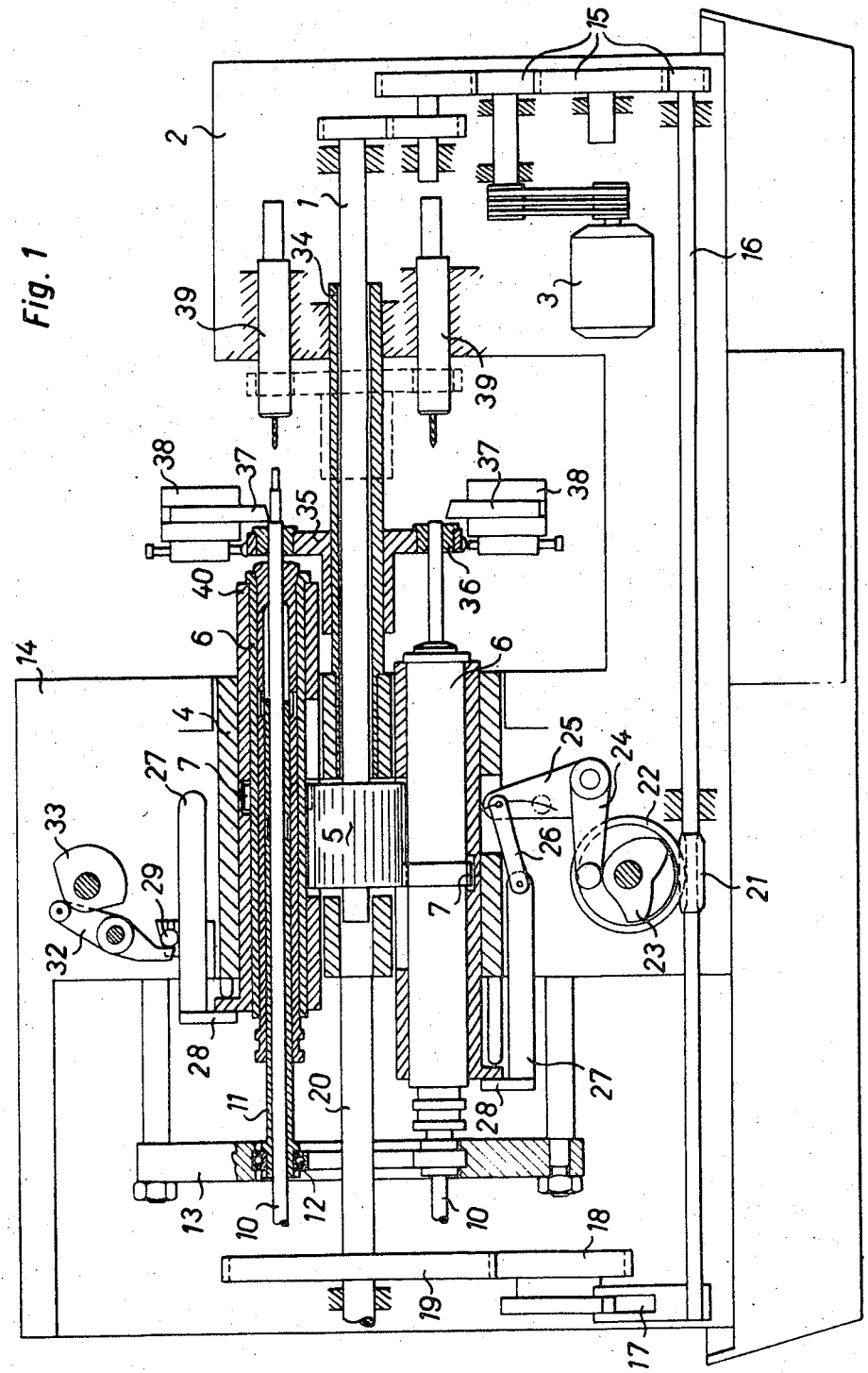
FIG. 1 is a diagramatic side elevational cross-sectional illustration of a multiple spindle machine embodying the present invention.

With reference now to the drawing, there is shown and illustrated an automatic multiple spindle bar machine constructed in accordance with the principles of the present invention which comprises a rotatable central shaft 1 extending generally horizontally outwardly of a head stock 2 and which may be driven at one end portion thereof by a motor 3 through reduction gearing in the usual manner. The other end portion of the central shaft 1 extends generally axially inwardly of the spindle carrier drum 4 and has secured thereto for rotation therewith a main spindle drive gear 5 disposed within the spindle carrier drum, 4. The spindle carrier drum 4 carries a plurality of hollow spindles 6 arranged in a generally cylindrical path concentric the main gear 5 and adapted to be rotated thereby, as by means of spindle driving gears 7 meshed therewith. In accordance with the present invention, the spindles 6 may be rotatably carried by generally cylindrical spindle sleeves 40 through which they may extend and be secured with so as to be longitudinally or axially retained against relative movement. The spindle sleeves 40 in turn, are generally slidable longitudinally or axially relative the spindle carrier 4 but secured against rotation relative thereto. Hence, the spindles 6 are free to both revolve within the spindle carrier drum 4 and move generally axially relative thereto while the spindle sleeves 40 may move axially or longitudinally relative the spindle carrier drum 4 without rotating relative thereto. The spindle drive main gear 5 may be of substantial longitudinal extent so as to remain enmeshed with the driving gears 7 carried by each of the spindles 6 throughout the displacement range of the spindles 6. The spindle gears 7 may be of substantially lesser width than the gear 5 so as to remain completely meshed with the gear 5 throughout the displacement range of the spindles 6 and the driving gears 7 are preferably connected with the spindles 6 so as to be rotatable therewith.

Disposed within each of the hollow spindles 6, there may be provided a work holding collar 8 whose jaws extend generally outwardly of the respective spindles 6 toward the head stock 2 and, generally internally and rearwardly of the work holding collar 8, a work advancing collar 9 which are together constructed and arranged to hold and advance work piece bars 10 through the spindles 6 from generally rearwardly thereof. The advancing collars 9 may be connected with advance tubes 11 which extend generally rearwardly thereof and supported at their rearward end portions in ball bearings 12 carried by a guide member 13 forming a part of the machine column 14 so that the work piece bars 10 may freely rotate with the collars and spindles. The guide member 13 may be longitudinally movable toward and away from the head stock 2 and there may be provided means driven from the control shaft 16, such as cam and follower arrangements for moving the guide member 13 and associated advance tubes 11 and advancing collars 9 forwardly within the spindles 6 to advance the work piece bars 10 toward the machine tools.

The spindle carrier drum 4 may be rotatably carried in the machine column 14 and may be rotatated so as to advance the spindles 6 consecutively to each of the spindle stations, as by means of the driving motor 3 through change speed gears 15, a main control shaft 16, a changeover gear 17, a pair of gears 18 and 19 and a spindle control shaft 20 through each of the spindle positions.

In addition to means for advancing the spindle carrier drum 4 and, therewith, the spindles 6 to adjacent spindle positions as set forth above, there may further be provided means for advancing the spindles generally axially or longitudinally to provide a feeding movement of the work piece while the spindles are at the respective spindle positions to enable, for example, relatively wide cuts to be performed on the work piece bars by a single point tool similar to the cut that would be performed utilizing a conventional engine lathe. Such spindle axial advance or spindle feed means may comprise, for example, a worm 21 mounted with the main control shaft 16 for rotation therewith, a worm gear 22 engaged with the worm for rotation thereby, a control cam 23 operatively connected with the worm gear 22 for rotation therewith, as, for example, as being mounted to the same shaft, a cam follower — bell crank comprising a pair of angularly disposed lever arms 24 and 25 and a rod 27 connected to the lever 25, as by means of an adjustable link 26. A similar drive would be provided for each of the spindle positions. The rods 27 are longitudinally movable or slidable in the machine column 14 relative the spindles 6 and spindle carrier drum 4 and may be provided at their rearward end portions with laterally extending driver portions 28 for engaging the rearward end portion of the respective spindle sleeve 40 and moving the spindle sleeve and spindle disposed therewithin in a forward work feeding direction upon radial outward movement of the cam follower carried by the lever 24. Since the drivers 28 are carried relative the machine column 14 with the spindle carrier drum 4 being rotatable relative thereto, as each of the spindle sleeves 40 is rotated or advanced into the spindle position corresponding to that driver, that driver may engage the rear end portion of the spindle sleeve to feed the work rod forwardly.

In order to enable the spindles 6 to be longitudinally fixed relative to the machine column when not being advanced by the cam 23 and, particularly, to prevent undesirable longitudinal return motion after completion of each operating feed, an automatically acting clamping device may be connected with each of the bars 27. Such a clamping device may comprise, for example, and with particular reference to FIG. 6, a clamping roller 29 located in a tapered or key-type recess 30 of the machine column 14. Engaged with the roller 29, there may be provided a spring biased pressure member 31 which forces the roller into the acute angle enclosed by the oblique wall recess 30 and the bar 27 so as to prevent the bar 27 from moving rearwardly of the machine column 14 since any tendency of the bar 27 to move rearwardly of the machine column 14 will merely act to wedge the roller 29 more firmly between the oblique wall of the recess 30 and the bar 27. The bar 27 is free to move, however, forwardly of the machine column 14 since any tendency of the bar 27 to move forwardly will merely result in a slight forward movement of the spring bias pressure member 31 and slight movement of the roller 29 out of the acute angle to release the bar 27. To enable the bar 27 to be returned, when desired, as at the start of the operating or machine cycle spindle station, there may be provided a two-armed lever 32 pivotally mounted relative the machine column 14 with one arm thereof engaged with the rearward surface of the roller 29 generally oppositely the pressure member 31 with the other arm thereof being operatively connected with a cam 33 driven from the control shaft 16.

Disposed generally forwardly of the machine column 14 and carried by the central tube 34 which surrounds the central shaft 1, there may be provided a guide member 35 for the ends of the work piece bars 10 projecting from the front ends of the spindles 6. This guide member may be disposed generally between the head stock and the spindle carrier drum 4 and be longitudinally movable along the central tube 34 and capable of being clamped thereto in a desired position. This guide member may be equipped with bushings or bearings 36 in alignment with the spindles 6 provided with apertures aligned with apertures in the collars 8 through which the work piece bars 10 project. The bearings or bushings 36 may comprise mere fixed bushings if the work piece bars 10 comprise round stock and may be rotatable relative the guide member 35 if polygonal material is machined. When not in use, the guide member 35 may be moved to the position indicated by the dotted lines in FIG. 1.

Various tools, such as turning tools 37 may be carried by transverse tool slides 38 which may be provided with adjustable stops for contacting the guide member 35 as a limit stop controlling the depth of the cut of the tools 37. Spindle sleeves 39 provided, for example, with drills or other tooling for performing end operations on the front face of the work piece may be carried by the head stock 2.

With reference now to FIGS. 3–5, inclusive, there is shown and illustrated a sequence of operations which may be performed on a machine constructed in accordance with the principles of the present invention as hereinabove described having transverse tool slides associated with each spindle position capable of independently feeding two separate tools generally radially of the spindle.

With the spindle 6 initially in the fully retracted or rearward position, the collar 8 may be opened, as, for example, by the rearward end of the collar tube engaging the guide member 13 or being independently operated through a cam driven from the control shaft 16. After closing the collar 8, the operating feed of the spindle 6 is started through the cam 23 with the work piece bar 10 clamped therein. As the spindle 6 advances the work piece bar 10 may be machined longitudinally by one of the turning tools 371 associated with that spindle position. When the spindle 6 has advanced to distance $a1$, further feeding movement of the spindle 6 may be halted or the advance thereof interrupted, and the automatic clamping device previously described will hold the spindle 6 against further forward movement. During this interruption of forward feeding or advance, a second turning tool 372 associated with this spindle position may be advanced generally radially inwardly of the work piece to produce a groove therein. After withdrawal of the turning tool 372, spindle advance or feed may be again initiated along a distance $a2$ while the turning tool 371 performs a further longitudinal machining operation, as shown. Next, the spindle 6 is advanced to the next spindle position by rotation of the spindle carrier drum 4 and the machining operations illustrated in FIG. 4 may be carried out at that position. In this position the spindle 6 and work piece bar 10 are further advanced by the distance $b1$ while returning tool 373 associated with this work, machining or spindle position machines the work piece longitudinally to a larger diameter than that which was machined at the previous spindle position. After the spindle has advanced to distance $b1$, feeding movement is halted and the automatic clamping device may hold the spindle 6 at that longitudinal position while a second turning tool 374 associated with this spindle position is moved inwardly to form a second groove in the work piece. Then, the spindle 6 may be again advanced by the cam 23, bar 27 and driver 28 associated with this spindle position a distance $b2$ while the tool 373 continues the longitudinal machining operation to complete the machining operations carried out at this work, machining or spindle position.

In the third spindle position, as illustrated in FIG. 5, the work piece bar may be further advanced a distance $c1$ during which time a cutting tool 375 associated with this spindle position performs a further longitudinal machining operation to a yet third diameter. At the same time, the boring tool mounted in the end spindle sleeve 39 may produce a bore in the face of the work piece. After the boring tool has been moved outwardly or backed off an amount equal to the distance $c2$, the advance or feed of the spindle 6 may be again interrupted and a second turning tool or cutoff tool 376 associated with the subject spindle position may advance radially inwardly to sever the finished work piece from the bar 10.

The spindle 6 may then be returned to its rear initial position with the collar 8 open and the advance collar 9 closed so that the spindle 6 is thus displaced along the work piece bar in a rearward direction by the length of the return path relative to the work piece bar which is fixed in the advance collar 9 and the cycle may then be repeated.

If the above-detailed machining of a work piece is, by way of example, performed on an automatic six-spindle machine, two work pieces may be finished at the same time in each position of the spindle carrier drum. Such an automatic machine therefore enables the production of a six-spindle machine to be doubled or a machine having fewer spindles be utilized to produce a desired complex part.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. In combination with an automatic lathe having a plurality of spindles rotatably carried generally cylindrically by a revolvable spindle carrier drum and means for rotatably indexing the spindle drum so as to index the spindles past a plurality of work stations, means for supporting the spindles and enabling rotational and longitudinal movement thereof relative the spindle carrier drum, means independently associated with each spindle station for automatically moving said spindles longitudinally relative said spindle carrier drum and gear means for rotating said spindles within said spindle drum from a common drive means operative independently of the longitudinal positioning and movement of said spindles wherein each of said supporting means, moving means and gear means is positioned generally radially outwardly of said spindles to enable the advancement of raw material bars entirely axially therethrough.

2. Lathe defined in claim 1 wherein said gear means for driving the spindles comprises a rotatable central shaft extending generally axially inwardly of the spindle drum generally concentrically said spindles, a wide central driving gear mounted for rotation with said central shaft and narrow driven gears mounted for rotation with each of said spindles meshed with said wide central driving gear, the width of said central driving gear being such that said narrow driven gears remain meshed therewith throughout the entire extent of the longitudinal movement of said spindle.

3. In combination with an automatic lathe having a plurality of spindles rotatably carried by revolvable spindle carrier drum and means for driving and controlling the spindles and the spindle drum, means for enabling the spindles to be longitudinally moved relative the spindle carrier drum comprising, in turn, a spindle 4. Lathe defined in claim 1 further comprising means for securing said spindles against longitudinal movement relative said spindle carrier drum in at least a work piece advancing direction.

5. Lathe defined in claim 3 wherein said means for advancing said spindles comprises a worm rotated by said driving means, a worm gear meshed with said worm, a control cam driven by said worm gear, a cam follower engaged with said cam for movement thereby and a rod longitudinally movable generally parallel said spindles having a driving arm extending generally laterally outwardly of its rear end portion engaging the rear end of said spindle sleeve, said rod being operatively connected with said cam follower for movement therewith.

6. Lathe defined in claim 5 further comprising means for clamping said rods in any desired position.

7. Lathe defined in claim 6 wherein said clamping means comprises automatically operated means for enabling free movement of said rods in a spindle advancing direction and automatic clamping of said rods against movement thereof in a spindle retracting direction.

8. Lathe defined in claim 7 wherein said clamping means comprises a clamping roller located in a key-type recess adjacent said rod having an oblique wall generally opposite thereto and approaching said rod in a spindle retracting direction, said roller being disposed within the acute angle formed by said rod and oblique wall and biasing means for urging said roller into said acute angle to automatically lock said rod against movement rearwardly thereof.

9. Lathe defined in claim 8 further comprising a lever having one arm portion engaged with the clamping roller opposite the biasing means therefor and the other arm portion operatively associated with a cam rotated by said driving means.

10. In combination with an automatic lathe having a plurality of spindles rotatably carried generally cylindrically by a revolvable spindle carrier drum, a rotatable central shaft extending generally axially inwardly of the spindle drum generally concentrically said spindles, a wide central gear mounted for rotation with one end portion of said central shaft and narrow gears mounted for rotation with each of said spindles meshed therewith, a spindle sleeve mounted with each of said spindles longitudinally movable but non-rotatably carried by the spindle carrier drum and rotatably but non-displaceably carrying said spindles, means for revolving said spindle carrier drum, means for driving said central shaft and means for automatically moving said spindle sleeves longitudinally of said spindle carrier drum wherein the width of said central gear is such that said narrow gears remain meshed therewith throughout the entire extent of the longitudinal movement of the spindles.

* * * * *